(12) United States Patent
No et al.

(10) Patent No.: US 9,274,392 B2
(45) Date of Patent: Mar. 1, 2016

(54) LIQUID CRYSTAL DISPLAY

(71) Applicant: Samsung Display Co., Ltd., Yongin (KR)

(72) Inventors: Sang-Yong No, Asan-si (KR); Youn-Hak Jeong, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 125 days.

(21) Appl. No.: 13/828,202

(22) Filed: Mar. 14, 2013

(65) Prior Publication Data

US 2014/0043554 A1 Feb. 13, 2014

(30) Foreign Application Priority Data

Aug. 9, 2012 (KR) .......................... 10-2012-0087391

(51) Int. Cl.
 *G02F 1/1337* (2006.01)
 *G02F 1/1362* (2006.01)
 *G02F 1/1343* (2006.01)

(52) U.S. Cl.
 CPC ...... *G02F 1/136227* (2013.01); *G02F 1/13624* (2013.01); *G02F 1/133753* (2013.01); *G02F 2001/134345* (2013.01)

(58) Field of Classification Search
 CPC .................... G02F 1/136227; G02F 1/133753; G02F 1/13624; G02F 2001/134345
 USPC .......................................................... 349/144
 See application file for complete search history.

(56) References Cited

U.S. PATENT DOCUMENTS 6,922,183 B2 * 7/2005 Ting et al. ........................ 345/87
7,023,516 B2 4/2006 Yoshida et al.
(Continued)

FOREIGN PATENT DOCUMENTS

JP 2009-282366 12/2009
JP 2011-221400 11/2011
(Continued)

*Primary Examiner* — James Dudek
(74) *Attorney, Agent, or Firm* — H.C. Park & Associates, PLC

(57) ABSTRACT

A liquid crystal display including: a first substrate including a pixel area including a first subpixel area and a second subpixel area; a first subpixel electrode positioned in the first subpixel area and a second subpixel electrode positioned in the second subpixel area; an insulating layer formed on the first and second subpixel electrodes; a third subpixel electrode positioned in the first subpixel area and overlapping the first subpixel electrode; a fourth subpixel electrode positioned in the second subpixel area and overlapping the second subpixel electrode; a second substrate facing the first substrate; and a liquid crystal layer interposed between the first substrate and the second substrate. The first and fourth subpixel electrodes are connected to a first thin film transistor, and the second and third subpixel electrodes are connected to a second thin film transistor.

18 Claims, 14 Drawing Sheets

(56) References Cited

U.S. PATENT DOCUMENTS

| | | |
|---|---|---|
| 7,324,170 B2 | 1/2008 | Baek |
| 7,898,607 B2 * | 3/2011 | Su et al. .......................... 349/38 |
| 8,035,787 B2 * | 10/2011 | Jung et al. ..................... 349/141 |
| 8,654,271 B2 * | 2/2014 | Lee et al. ......................... 349/43 |
| 2009/0046233 A1 | 2/2009 | Cho et al. |
| 2010/0123867 A1 | 5/2010 | Jung et al. |
| 2010/0296015 A1 | 11/2010 | Kim et al. |
| 2011/0149224 A1 | 6/2011 | Tseng et al. |
| 2011/0156993 A1 * | 6/2011 | Ting et al. ....................... 345/87 |
| 2011/0157121 A1 * | 6/2011 | Chan .............................. 345/211 |
| 2011/0310335 A1 * | 12/2011 | Hashimoto et al. ............. 349/96 |
| 2013/0002625 A1 * | 1/2013 | Liao et al. ..................... 345/205 |
| 2013/0057813 A1 | 3/2013 | Jeong et al. |

FOREIGN PATENT DOCUMENTS

| | | |
|---|---|---|
| JP | 2011-221505 | 11/2011 |
| JP | 2011-248133 | 12/2011 |
| JP | 2012-032779 | 2/2012 |
| KR | 10-2013-0027370 | 3/2013 |

* cited by examiner (a)   (b)

(a)   (b)

FIG.13
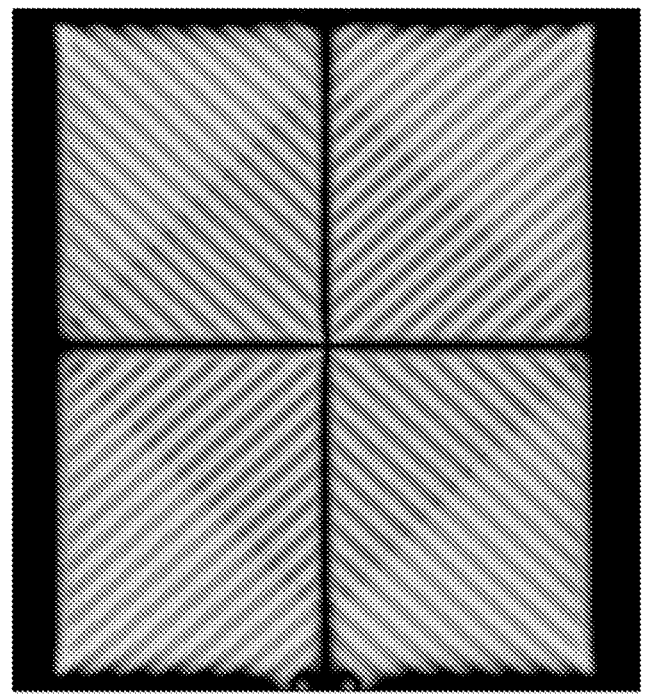
(a)
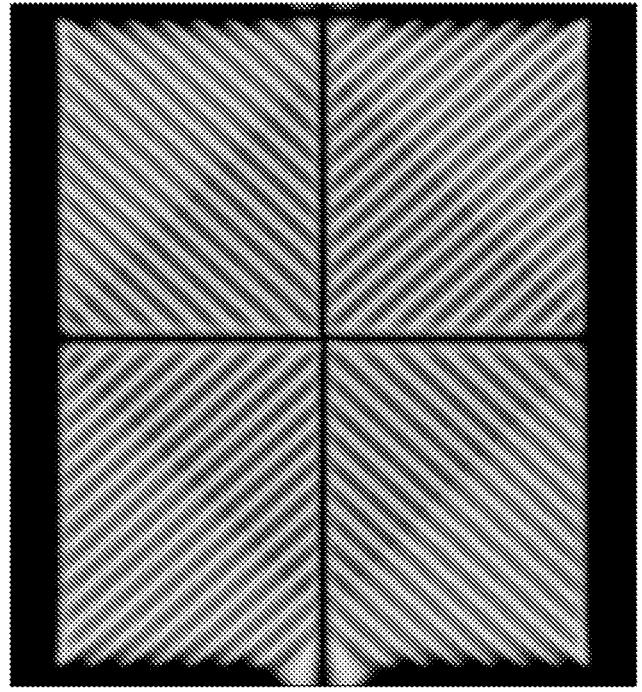
(b)

LIQUID CRYSTAL DISPLAY

CROSS-REFERENCE TO RELATED APPLICATION

This application claims priority from and the benefit of Korean Patent Application No. 10-2012-0087391, filed on Aug. 9, 2012, which is hereby incorporated by reference for all purposes as if fully set forth herein.

BACKGROUND OF THE INVENTION

1. Field

Exemplary embodiments of the present invention relate to display devices, such as a liquid crystal display.

2. Description of the Related Art

Liquid crystal displays (LCDs) are one of the most widely used flat panel displays in the recent times. An LCD typically includes a pair of panels provided with field-generating electrodes, such as pixel electrodes and a common electrode, and a liquid crystal (LC) layer interposed between the two panels. The LCD displays images by applying voltages to the field-generating electrodes to create an electric field in the LC layer that determines the orientations of the LC molecules therein to adjust the polarization of incident light.

Among the LCDs, a vertical alignment (VA) mode LCD, which aligns LC molecules such that their longitudinal axes are perpendicular to the panels in the absence of an electric field, is highly regarded because of its high contrast ratio and wide reference viewing angle. Here, the reference viewing angle represents a viewing angle that has a contrast ratio of 1:10, or a critical angle of gray-to-gray luminance reversion.

When it comes to vertical alignment mode LCDs, in order to improve its side visibility closer to the front visibility, a method of creating a difference in transmittance by dividing one pixel into two sub-pixels and applying different voltages to the two sub-pixels has been used.

In this case, however, the luminance according to the grayscale changes rather quickly, particularly in a low grayscale portion or a high grayscale portion such that the gray expression of the display is distorted or incorrect, especially from the side, and the overall display quality deteriorates. Therefore, there is a need for a LCD device that can render an improved grayscale with superior side visibility.

SUMMARY OF THE INVENTION

Exemplary embodiments of the present invention provide a liquid crystal display capable of expressing an accurate grayscale in the low gray region and the high gray region while maintaining its side visibility close to the front visibility, along with a high transmission characteristic and a high speed response characteristic.

Additional features of the invention will be set forth in the description which follows, and in part will be apparent from the description, or may be learned by practice of the invention.

An exemplary embodiment of the present invention discloses a liquid crystal display including: a first substrate including a pixel area including a first subpixel area and a second subpixel area; a first subpixel electrode disposed in the first subpixel area and a second subpixel electrode disposed in the second subpixel area on the first substrate; an insulating layer disposed on the first subpixel electrode and the second subpixel electrode; a third subpixel electrode disposed on the insulating layer in the first subpixel area and overlapping the first subpixel electrode; a fourth subpixel electrode disposed on the insulating layer in the second subpixel area and overlapping the second subpixel electrode; a second substrate facing the first substrate; and a liquid crystal layer interposed between the first substrate and the second substrate and including liquid crystal molecules, wherein the first subpixel electrode and the fourth subpixel electrode are connected to a first thin film transistor, and the second subpixel electrode and the third subpixel electrode are connected to a second thin film transistor.

The first subpixel electrode and the second subpixel electrode may have a plate shape, and the third subpixel electrode and the fourth subpixel electrode may have a cross-shaped stem including a transverse stem and a longitudinal stem crossing the transverse stem and a plurality of minute branch electrodes extending from the cross-shaped stem.

An exemplary embodiment of the present invention also discloses a liquid crystal display including: a first substrate; a second substrate facing the first substrate; a liquid crystal layer interposed between the first substrate and the second substrate and including liquid crystal molecules; a first gate line and a first data line disposed on the first substrate; a first thin film transistor and a second thin film transistor both connected to the first gate line and the first data line; a first pixel electrode connected to the first thin film transistor and a second pixel electrode connected to the second thin film transistor, the first pixel electrode partially overlapping the second pixel electrode relative to a direction perpendicular to the first substrate and the second substrate; and a third pixel electrode connected to the first thin film transistor and a fourth pixel electrode connected to the second thin film transistor, the third pixel electrode partially overlapping the fourth pixel electrode relative to a direction perpendicular to the first substrate and the second substrate.

The third subpixel electrode and the fourth subpixel electrode may have a plurality of minute slits defining a plurality of branch electrodes, and the width of the plurality of branch electrodes and the width of the plurality of minute slits may be the same as or different from each other.

The first subpixel electrode and the second subpixel electrode may have a rhombus plane shape, a hexagonal plane shape, or a quadrangle plane shape.

A voltage charged to the first subpixel electrode and the fourth subpixel electrode may be different from a voltage charged to the second subpixel electrode and the third subpixel electrode.

An alignment layer disposed on at least one of the first substrate and the second substrate may be further included, and at least one of the liquid crystal layer and the alignment layer may include a photoreactive material.

In the liquid crystal display according to an exemplary embodiment of the present invention, one pixel area includes the first subpixel electrode and the second subpixel electrode of the plate shape, and the third subpixel electrode and the fourth subpixel electrode including the portion overlapping the first subpixel electrode and the second subpixel electrode and having a plurality of branch electrodes. The voltage applied to the first subpixel electrode and the fourth subpixel electrode is smaller than the voltage applied to the second subpixel electrode and the third subpixel electrode, thereby dividing one pixel area into four regions in which intensities of the electric field applied to the liquid crystal layer are different from each other. Accordingly, by smoothly controlling the transmittance change according to the grayscale, any quick change of the transmittance according to the gray change may be prevented in the low gray and the high gray at the side, and thereby the correct gray expression is possible in the low gray and the high gray while making the side visibility closer to the front visibility.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 13 is a view of a simulation result of a liquid crystal display according another experimental example of the present invention.

DETAILED DESCRIPTION OF THE EMBODIMENTS

Figure 1:
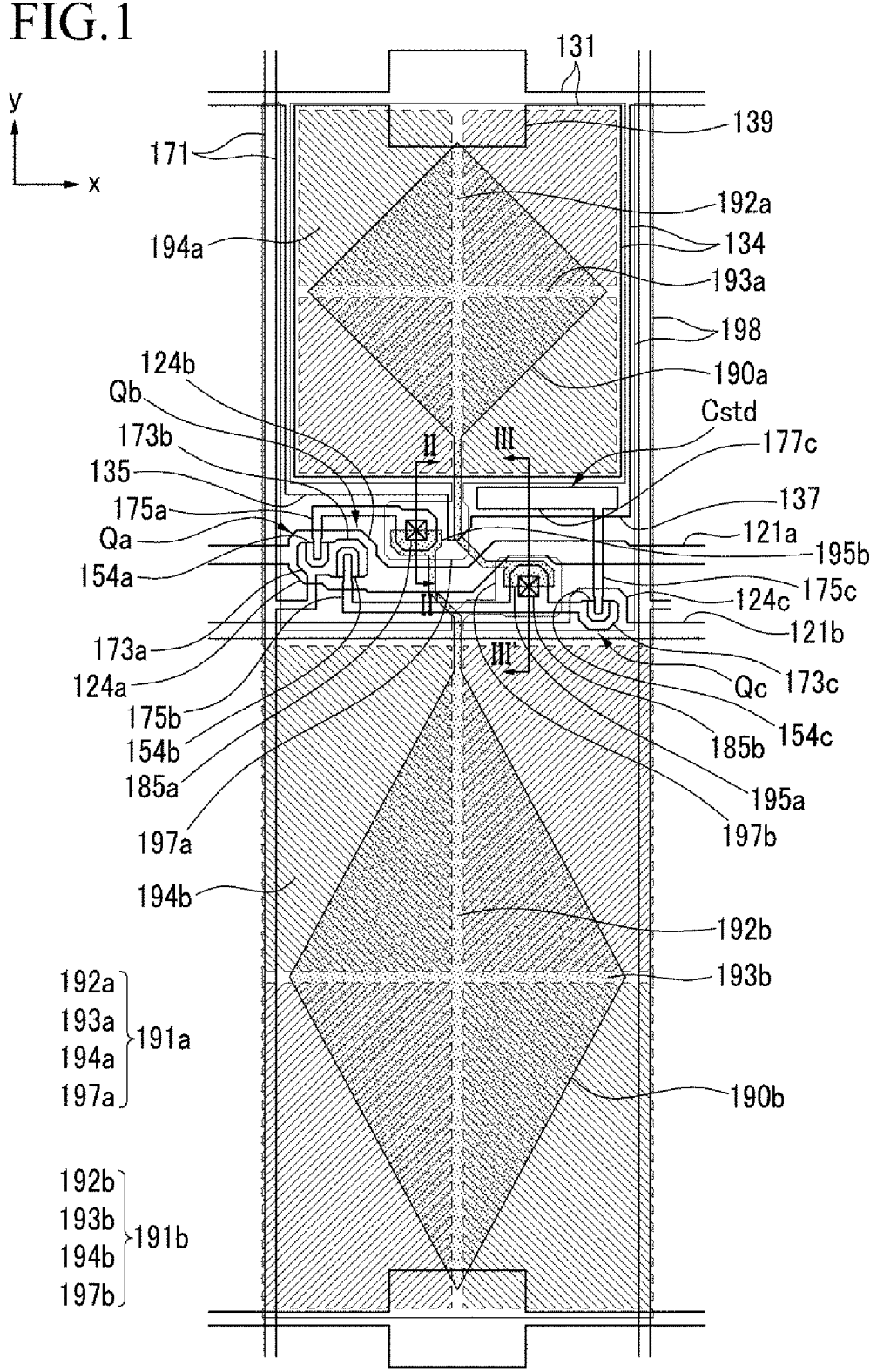
FIG. 1 is a layout view of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Now, a liquid crystal display according to an exemplary embodiment of the present invention will be described with reference to FIG. 1 to FIG. 3. FIG. 1 is a layout view of a liquid crystal display according to an exemplary embodiment of the present invention, FIG. 2 is a cross-sectional view of the liquid crystal display of FIG. 1 taken along the line II-II, and FIG. 3 is a cross-sectional view of the liquid crystal display of FIG. 1 taken along the line III-III.

Figure 2:
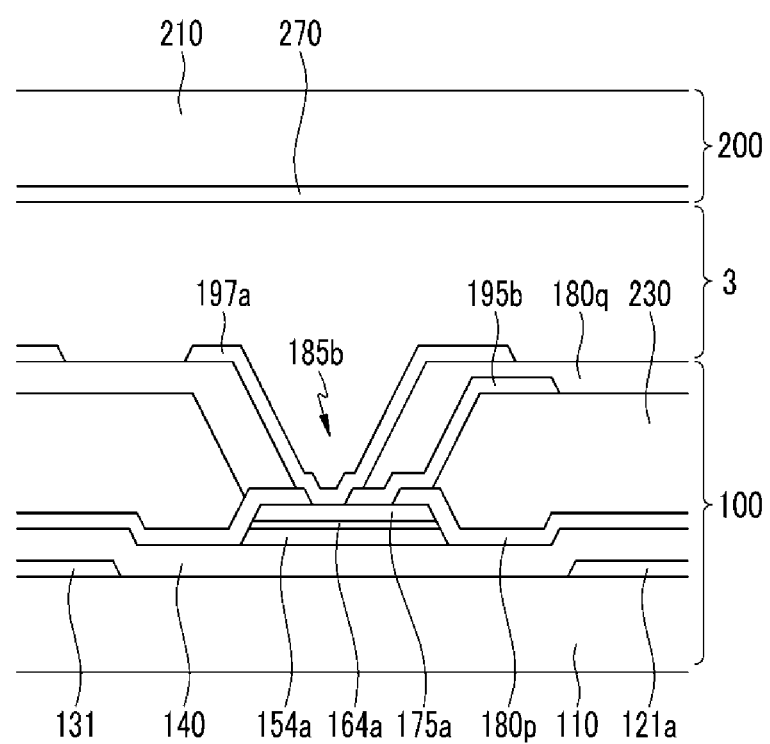
FIG. 2 is a cross-sectional view of the liquid crystal display of FIG. 1 taken along the line II-II.
Figure 3:
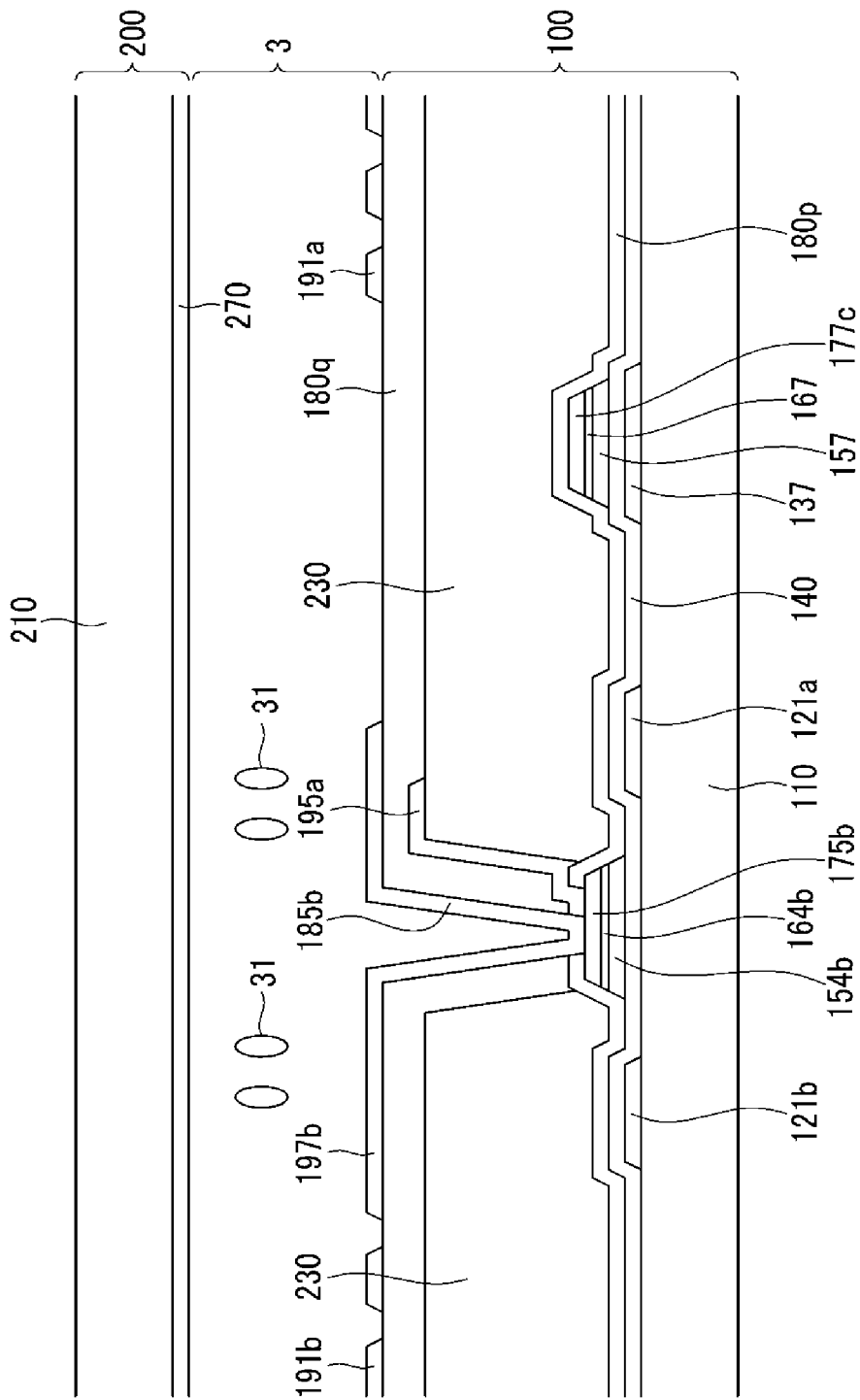
FIG. 3 is a cross-sectional view of the liquid crystal display of FIG. 1 taken along the line III-III.

Referring to FIG. 1 to FIG. 3, a liquid crystal display according to the present exemplary embodiment includes a first display panel 100 and a second display panel 200 and a liquid crystal layer 3 interposed between the two display panels 100 and 200.

Among these, the lower panel 100 is first described in accordance with one embodiment.

A plurality of gate conductors including a plurality of gate lines, such as a first gate line 121a and a second gate line 121b and a plurality of storage electrode lines 131, are formed on a first substrate 110 including a pixel area.

According to one embodiment, the gate lines 121a and 121b may extend mainly in a transverse direction and transmit gate signals. The first gate line 121a may include a first gate electrode 124a and a second gate electrode 124b, for instance, protruding upward and downward, respectively, and the second gate line 121b may include a third gate electrode 124c, for instance, protruding upward. The first gate electrode 124a and the second gate electrode 124b may be connected to each other, thereby forming one protrusion.

The storage electrode lines 131 may mainly extend in the transverse direction, and transfer a predetermined voltage such as a common voltage. Each storage electrode line 131 may include a pair of longitudinal portions 134 extending from the storage electrode line 131 in the longitudinal direction, a transverse portion 135 connecting the pair of longitudinal portions 134 to each other, and an extending storage electrode 139. The transverse portion 135 may include an extending capacitive electrode 137.

In addition, a gate insulating layer 140 may be formed on the gate conductors 121a, 121b, and 131.

A plurality of semiconductors 154a, 154b, and 154c, which may be made of a semiconductor material such as amorphous silicon or crystallized silicon, are formed on the gate insulating layer 140. The semiconductors 154a, 154b, and 154c may alternatively be made of other semiconductor materials, such as oxide semiconductors.

The semiconductors may include first and second semiconductors 154a and 154b, for instance, protruding toward the first and second gate electrodes 124a and 124b and connected to each other, and may further include a third semiconductor 154c disposed on the third gate electrode 124c. The third semiconductor 154c includes an extending portion 157 disposed on the capacitive electrode 137.

A plurality of ohmic contacts 164a, 164b, and 167 may be formed in pairs on the semiconductors 154a, 154b, and 154c, respectively. When the semiconductors 154a, 154b, and 154c are oxide semiconductors, the ohmic contacts may be omitted. The ohmic contacts may be made of silicide or of a material of n+ hydrogenated amorphous silicon doped with an n-type impurity at a high concentration.

Data conductors 171, 173a, 173b 173c, 175a, 175b, 175c and 177c may be formed on the ohmic contacts and the gate insulating layer 140. The data conductors 171, 173a, 173b-173c, 175a, 175b, 175c and 177c may include a data line 171, which includes a first source electrode 173a and a second source electrode 173b, a first drain electrode 175a, a second drain electrode 175b, a third source electrode 173c, a third drain electrode 175c, and an capacitive portion 177c extending from the third drain electrode 175c.

According to one embodiment, the second drain electrode 175b may be connected to the third source electrode 173c.

The first gate electrode 124a, the first source electrode 173a, and the first drain electrode 175a may form a first thin film transistor Qa along with the first semiconductor 154a, as a channel of the thin film transistor is formed in a semiconductor portion 154a between the first source electrode 173a and the first drain electrode 175a. Similarly, the second gate electrode 124b, the second source electrode 173b, and the second drain electrode 175b may form a second thin film transistor Qb together with the second semiconductor 154b, as a channel of the thin film transistor is formed in a semiconductor portion 154b between the second source electrode 173b and the second drain electrode 175b. Further, the third gate electrode 124c, the third source electrode 173c, and the third drain electrode 175c may form a third thin film transistor Qc together with the third semiconductor 154c, as a channel of the thin film transistor is formed in a semiconductor portion 154c between the third source electrode 173c and the third drain electrode 175c.

The semiconductors 154a, 154b, and 154c except for the channel regions between the source electrodes 173a, 173b, and 173c and the drain electrodes 175a, 175b, and 175c may have substantially the same plane shape as the data conductors 171a, 171b, 173a, 173b, 173c, 175a, 175b, and 175c and the underlying ohmic contacts.

In accordance with one embodiment, the first semiconductor 154a may include a portion that is not covered by the first source electrode 173a and the first drain electrode 175a so as to be exposed between the first source electrode 173a and the first drain electrode 175a. Likewise, the second semiconductor 154b may include a portion that is not covered by the second source electrode 173b and the second drain electrode 175b to be exposed between the second source electrode 173b and the second drain electrode 175b, while the third semiconductor 154c may include a portion that is not covered by the third source electrode 173c and the third drain electrode 175c to be exposed between the third source electrode 173c and the third drain electrode 175c.

A first passivation layer 180p, for instance, made of an inorganic insulator such as silicon nitride or silicon oxide, may be formed on the data conductors 171, 173a, 173b 173c, 175a, 175b, and 175c and the exposed semiconductor portions 154a, 154b, and 154c.

According to one embodiment, a color filter 230 may be positioned on the first passivation layer 180p. The color filter 230 is positioned at most of the region except where the first thin film transistor Qa, the second thin film transistor Qb, and the third thin film transistor Qc are disposed. However, the color filter 230 may extend in the longitudinal direction between the neighboring data lines 171. Although the color filter 230 is formed on the first display panel 100 in the present exemplary embodiment, it may be formed on the second display panel 200.

Further, a light blocking member (not shown) may be positioned on the first display panel 100. On the other hand, when the color filter 230 is formed on the second display panel 200, a light blocking member may also be positioned on the second display panel 200.

In accordance with one embodiment, a first subpixel electrode 190a and a second subpixel electrode 190b, for instance, in a plate shape, may be formed on the color filter 230. The first subpixel electrode 190a may include a first contact portion 195a extending toward the second drain electrode 175b, and the second subpixel electrode 190b may include a second contact portion 195b toward the first drain electrode 175a.

The first subpixel electrode 190a and the second subpixel electrode 190b may have a plate shape with a rhombus shape in a unit pixel area. The plate shape may be a shape that is integral. In other words, the plate shaped electrodes may not have any slits or cutouts. Alternatively, in some exemplary embodiments, it is conceived that the plate shaped electrodes may include slits or cutouts. The first subpixel electrode 190a and the second subpixel electrode 190b may have a rhombus shape and be positioned in a portion of the pixel area. However, the shape of the first subpixel electrode 190a and the second subpixel electrode 190b is not limited to the rhombus shape, and may have various shapes positioned at the portion of the pixel area to partially overlap a third subpixel electrode 191a and a fourth subpixel electrode 191b, as is described below. Pixel and subpixel electrodes according to one embodiment may be made of a transparent conductive material such as ITO (indium tin oxide) and IZO (indium zinc oxide), or reflective metals such as aluminum, silver, and chromium or an alloy thereof.

According to one embodiment, the first passivation layer 180p has contact holes 185a and 185b exposing the first drain electrode 175a and the second drain electrode 175b, and the first contact portion 195a of the first subpixel electrode 190a is connected to the second drain electrode 175b and the second contact portion 195b of the second subpixel electrode 190b is connected to the first drain electrode 175a through the contact holes 185a and 185b, respectively.

Further, a second passivation layer 180q may be positioned on the first subpixel electrode 190a and the second subpixel electrode 190b. The second passivation layer 180q may include an inorganic insulating material or an organic insulating material.

In accordance with one embodiment, the third subpixel electrode 191a and the fourth subpixel electrode 191b may be formed on the second passivation layer 180q.

For example, a portion of the third subpixel electrode 191a overlaps the first subpixel electrode 190a via the second passivation layer 180q, and the remaining portion thereof does not overlap the first subpixel electrode 190a. Similarly, a portion of the fourth subpixel electrode 191b overlaps the second subpixel electrode 190b via the second passivation layer 180q, and the remaining portion thereof does not overlap the second subpixel electrode 190b.

That is, the first subpixel electrode 190a is positioned under a portion of the third subpixel electrode 191a to overlap the third subpixel electrode 191a, and the second subpixel electrode 190b is positioned under a portion of the fourth subpixel electrode 191b to overlap the fourth subpixel electrode 191b.

The third subpixel electrode 191a and the fourth subpixel electrode 191b are divided with the first gate line 121a and the second gate line 121b therebetween. Referring to FIG. 1, the third subpixel electrode 191a and the fourth subpixel electrode 191b are disposed adjacent to each other in the column direction. According to one embodiment, the length of the fourth subpixel electrode 191b may be longer than that of the third subpixel electrode 191a, and vice versa.

According to one embodiment, the overall shape of each of the third sub-pixel electrode 191a and the fourth sub-pixel electrode 191b may be a polygon, such as a quadrangle, and the third sub-pixel electrode 191a and the fourth sub-pixel electrode 191b respectively may include a cross-shaped stem including horizontal stems 193a and 193b and longitudinal stems 192a and 192b crossing the horizontal stems 193a and 193b. Also, the third subpixel electrode 191a and the fourth subpixel electrode 191b respectively may include a plurality of minute branch electrodes 194a and 194b, a first protrusion 197a, and a second protrusion 197b. Although the drawings only show exemplary electrodes and stems of particular shape, one of ordinary skill in the art will appreciate that the electrodes and stems may not only be quadrangles and cross-shaped, but also be formed in any suitable shape and arrangement to provide multiple subpixels overlapping each other.

According to one embodiment, the third subpixel electrode 191a and the fourth subpixel electrode 191b may be divided into four sub-regions by the horizontal stems 193a and 193b and the longitudinal stems 192a and 192b. The minute branch electrodes 194a and 194b may obliquely extend from the horizontal stems 193a and 193b and the longitudinal stems 192a and 192b, and the extending direction thereof may form an angle, for example, of about 45 degrees or 135 degrees, with the gate lines 121a and 121b or the horizontal stems 193a and 193b. Also, the minute branch electrodes 194a and 194b of two neighboring sub-regions may be formed so that their directions form an angle, for example, perpendicularly.

In the present exemplary embodiment, the third sub-pixel electrode 191a may further include an outer stem enclosing the outer portion thereof. Further, the fourth sub-pixel electrode 191b may further include horizontal portions positioned on the upper and lower portions thereof, while the third sub-pixel electrode 191a may further include right and left longitudinal portions 198 positioned on the right and left sides thereof. The right and left longitudinal portions 198 can prevent capacitive coupling between the data line 171 and the third sub-pixel electrode 191a.

Through the contact holes 185a and 185b formed in the first passivation layer 180p and the second passivation layer 180q, the first protrusion 197a of the third subpixel electrode 191a is connected to the first drain electrode 175a, and the second protrusion 197b of the fourth subpixel electrode 191b is connected to the second drain electrode 175b.

The first subpixel area where the first subpixel electrode 190a and the third subpixel electrode 191a are positioned includes a first region where the first subpixel electrode 190a and the third subpixel electrode 191a do not overlap and a second region where the first subpixel electrode 190a and the third subpixel electrode 191a overlap.

Similarly, the second subpixel area where the second subpixel electrode 190b and the fourth subpixel electrode 191b are positioned includes a third region where the second subpixel electrode 190b and the fourth subpixel electrode 191b do not overlap and a fourth region where the second subpixel electrode 190b and the fourth subpixel electrode 191b overlap.

In driving the liquid crystal display, the electric field generated in the first region and the electric field generated in the second region are different from each other such that the inclination angle of liquid crystal molecules positioned in the first region and the inclination angle of the liquid crystal molecules positioned in the second region are different from each other. Similarly, the inclination angle of the liquid crystal molecules positioned in the third region and the inclination angle of the liquid crystal molecules positioned in the fourth region are different from each other.

As described above, in a liquid crystal display according to the present exemplary embodiment, each subpixel area is divided into a region where two subpixel electrodes overlap each other and a region where only one subpixel electrode is positioned, thereby dividing one pixel area into a total of four regions. Accordingly, a voltage-transmittance graph of the liquid crystal display can have a smooth curve. Accordingly, unlike a conventional liquid crystal display dividing one pixel area into two subpixel areas, the drastic changes of the transmittance with respect to high or low grayscale regions can be prevented, as is described in detail below.

In addition, a first alignment layer (not shown) may be positioned on the third pixel electrode 191a and the fourth pixel electrode 191b.

In accordance with one embodiment, the second display panel 200 is described.

A common electrode 270 may be formed on a second insulation substrate 210. Additional layers such as a light blocking member (not shown), a color filter (not shown), and the like may be formed on the second display panel 200.

A second alignment layer (not shown) may be positioned on the common electrode 270.

According to one embodiment, the liquid crystal layer 3 may have a negative dielectric anisotropy, and the liquid crystal molecules 31 of the liquid crystal layer 3 may be aligned so that the major axis thereof is perpendicular to the surfaces of the two display panels in the absence of an electric field. The liquid crystal molecules 31 may be pretilted such that the longitudinal axes thereof are approximately parallel to a lengthwise direction of the fine branch electrodes 194a and 194b. At least one of the liquid crystal layer and the alignment layers may include a photoreactive material including a reactive mesogen as an alignment supplement agent.

Figure 4:
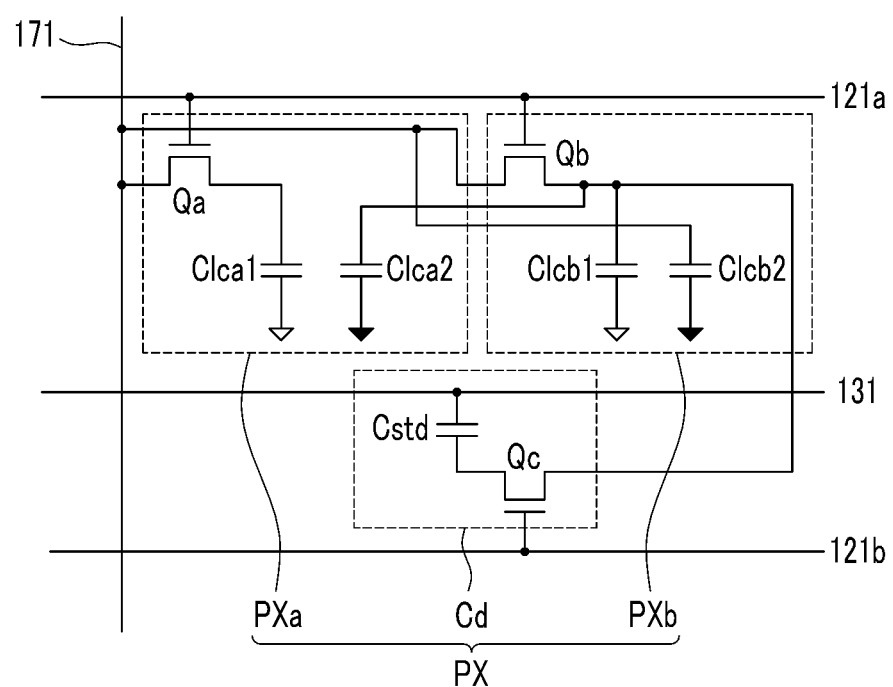
FIG. 4 is an equivalent circuit diagram of one pixel of a liquid crystal display according to an exemplary embodiment of the present invention.

Hereinafter, a method of driving a liquid crystal display according to an exemplary embodiment of the present invention will be described with reference to FIG. 4 as well as FIG. 1 to FIG. 3. FIG. 4 is an equivalent circuit diagram of one pixel of a liquid crystal display according to an exemplary embodiment of the present invention.

Referring to FIG. 4, a liquid crystal display according to an exemplary embodiment of the present invention includes a plurality of signal lines including the first gate line 121a, the second gate line 121b, a storage electrode line 131, and a data line 171, and a pixel PX connected thereto.

According to one embodiment, each pixel PX includes a first subpixel PXa, a second subpixel PXb, and a step-down unit Cd, and further includes a first switching element Qa, a second switching element Qb, a third switching element Qc, a first liquid crystal capacitor Clca1, a second liquid crystal capacitor Clca2, a third liquid crystal capacitor Clcb1, and a fourth liquid crystal capacitor Clcb2 connected to the plurality of signal lines.

The first liquid crystal capacitor Clca1 and the second liquid crystal capacitor Clca2 are positioned in the region of the first subpixel PXa, and the third liquid crystal capacitor Clcb1 and the fourth liquid crystal capacitor Clcb2 are positioned in the region of the second subpixel PXb.

As described above, one pixel area PX may include multiple subpixel area, such as the first subpixel area PXa and the second subpixel area PXb, while the first subpixel electrode 190a and the third subpixel electrode 191a are positioned in the first subpixel area PXa, and the second subpixel electrode 190b and the fourth subpixel electrode 191b are positioned in the second subpixel area PXb.

The first subpixel area PXa includes a first region where the first subpixel electrode 190a and the third subpixel electrode 191a do not overlap each other, and a second region where the first subpixel electrode 190a and the third subpixel electrode 191a overlap. The first region contains the first liquid crystal capacitor Clca1, and the second region contains the second liquid crystal capacitor Clca2.

Similarly, the second subpixel area PXb includes a third region where the second subpixel electrode 190b and the fourth subpixel electrode 191b do not overlap each other, and a fourth region where the second subpixel electrode 190b and the fourth subpixel electrode 191b overlap. The third region forms the third liquid crystal capacitor Clcb1, and the fourth region forms the fourth liquid crystal capacitor Clcb2.

According to one embodiment, the first switching element Qa and the second switching element Qb are connected to the first gate line 121a and the data line 171, and the third switching element Qc is connected to the output terminal of the second switching element Qb and the step-down capacitor Cstd.

The first switching element Qa and the second switching element Qb may be three-terminal elements such as thin film transistors, and include a control terminal connected to the first gate line 121a and an input terminal connected to the data line 171. Further, the output terminal of the first switching element Qa may connected to the first liquid crystal capacitor Clca1 and the fourth liquid crystal capacitor Clcb2, and the output terminal of the second switching element Qb may be connected to the second liquid crystal capacitor Clca2, the third liquid crystal capacitor Clcb1, and the input terminal of the third switching element Qc.

The third switching element Qc, which may be a three-terminal element such as a thin film transistor, includes a control terminal connected to the second gate line 121b, an input terminal connected to the second liquid crystal capacitor Clca2 and the third liquid crystal capacitor Clcb1, and an output terminal connected to the step-down capacitor Cstd.

If a gate on signal is applied to the first gate line 121a, the first switching element Qa and the second switching element Qb connected thereto are turned on. Accordingly, a data voltage on the data line 171 is applied to the first subpixel PXa and the second subpixel PXb through the turned-on first switching element Qa and second switching element Qb. At this time, the data voltage applied to the first subpixel PXa and the second subpixel PXb may be charged with the same value.

Next, when a gate off signal is applied to the first gate line 121a, and a gate on signal is applied to the second gate line 121b, a portion of the charges with the second liquid crystal capacitor Clca2 and the third liquid crystal capacitor Clcb1 is charged to the step-down capacitor Cstd through the third switching element Qc connected to the second switching element Qb in series. Accordingly, the second liquid crystal capacitor Clca2 and the third liquid crystal capacitor Clcb1 are charged with a first voltage, which has a lower value than the data voltage. Accordingly, the voltage charged to the first liquid crystal capacitor Clca1, the voltage charged to the second liquid crystal capacitor Clca2, the voltage charged to the third liquid crystal capacitor Clcb1, and the voltage charged to the fourth liquid crystal capacitor Clcb2 are changed.

The voltages charged to the first liquid crystal capacitor Clca1, the second liquid crystal capacitor Clca2, the third liquid crystal capacitor Clcb1, and the fourth liquid crystal capacitor Clcb2 are different from each other such that two regions where the inclination angles of the liquid crystal molecules are different are formed in the first subpixel PXa, and two regions where the inclination angles of the liquid crystal molecules are different are formed in the second subpixel PXb. Accordingly, four regions having different luminances are formed in one pixel PX.

Accordingly, by properly controlling the voltages charged in the first liquid crystal capacitor Clca1, the second liquid crystal capacitor Clca2, the third liquid crystal capacitor Clcb1, and the fourth liquid crystal capacitor Clcb2, images viewed from the side may be closest to images viewed from the front, and thus the liquid display can have superior side visibility. Further, the transmittance changes smoothly with respect to a grayscale, especially in a low grayscale portion and a high grayscale portion, and a more correct grayscale expression is enabled as a result.

The first region of the first subpixel area PXa forms the first liquid crystal capacitor Clca1 by the voltage difference between the data voltage applied to the third subpixel electrode 191a through the data line 171 and the common voltage applied to the common electrode. The second region of the first subpixel area PXa forms the second liquid crystal capacitor Clca2 by the voltage difference between the data voltage applied to the third subpixel electrode 191a and the first voltage charged to the first subpixel electrode 190a, and the common voltage applied to the common electrode. According to one embodiment, the third subpixel electrode 191a may have a plurality of minute slits defining a plurality of minute branch electrodes such that the influence of the first subpixel electrode 190a is increased in a portion that is not covered by the third subpixel electrode 191a through the minute slits. Accordingly, the intensity of the electric field applied to the liquid crystal layer 3 in the second region where the third subpixel electrode 191a and the first subpixel electrode 190a overlap each other may be weaker than the intensity of the electric field applied to the liquid crystal layer 3 in the first region.

Similarly, the first region of the third subpixel area PXb forms the third liquid crystal capacitor Clcb1 by the voltage difference between the first voltage charged to the fourth subpixel electrode 191b and the common voltage applied to the common electrode. The fourth region of the second subpixel area PXb forms the fourth liquid crystal capacitor Clcb2 by the voltage difference of the data voltage applied to the second subpixel electrode 190b through the first switching element Qa and the first voltage charged to the fourth subpixel electrode 191b, and the common voltage applied to the common electrode.

The fourth subpixel electrode 191b has a plurality of minute slits defining a plurality of minute branch electrodes such that the influence of the second subpixel electrode 190b is increased in a portion that is not covered by the fourth subpixel electrode 191b through the minute slits. Accordingly, the intensity of the electric field applied to the liquid crystal layer 3 in the fourth region where the fourth subpixel electrode 191b and the second subpixel electrode 190b overlap each other may be stronger than the intensity of the electric field applied to the liquid crystal layer 3 in the second region.

Accordingly, the voltage charged to the first liquid crystal capacitor Clca1 is strongest, and the voltage charged to the second liquid crystal capacitor Clca2 is lower than the voltage charged to the first liquid crystal capacitor Clca1 by the influence of the first voltage charged to the first subpixel electrode 190a. The voltage charged to the fourth liquid crystal capacitor Clcb2 is higher than the voltage charged to the third liquid crystal capacitor Clcb1 by the influence of the second subpixel electrode 190b applied with the data voltage.

Also, by the third subpixel electrode 191a, the voltage charged to the second liquid crystal capacitor Clca2 is higher than the voltage charged to the fourth liquid crystal capacitor Clcb2 of the fourth region where the fourth subpixel electrode 191b and the second subpixel electrode 190b overlap each other.

Accordingly, according to one embodiment, the charged voltages vary, for instance, in the order of the voltage charged to the first liquid crystal capacitor Clca1, the voltage charged to the second liquid crystal capacitor Clca2, the voltage charged to the fourth liquid crystal capacitor Clcb2, and the voltage charged to the third liquid crystal capacitor Clcb1.

The difference in the voltages charged to the liquid crystal capacitors in the first to fourth regions where the first to fourth liquid crystal capacitors Clca1, Clca2, Clcb1, and Clcb2 are positioned may be changed according to the width of the minute slits of the third subpixel electrode 191a and the fourth subpixel electrode 191b or the region occupied by each subpixel electrode. For example, as the area of the first subpixel electrode 190a and the second subpixel electrode 190b is increased, in the first subpixel area PXa, the influence of the first subpixel electrode 190a applied with the first voltage is increased such that the entire luminance is decreased, while in the second subpixel area PXb, the influence of the second subpixel electrode 190b applied with the data voltage is increased such that the entire luminance may be increased.

Also, as the width of the minute slits of the third subpixel electrode 191a and the fourth subpixel electrode 191b is increased, in the first subpixel area PXa, the influence of the first subpixel electrode 190a applied with the first voltage is increased such that the entire luminance is decreased, while in the second subpixel area PXb, the influence of the second subpixel electrode 190b applied with the data voltage is increased such that the entire luminance may be increased.

Also, in the first to fourth regions where the first to fourth liquid crystal capacitors Clca1, Clca2, Clcb1, and Clcb2 are positioned, the difference in the voltages charged to the liquid crystal capacitors may vary according to the difference between the data voltage and the first voltage.

In the present exemplary embodiment, the output terminal of the third switching element Qc is connected to the step-down capacitor Cstd. However, in the liquid crystal display according to another exemplary embodiment of the present invention, the control terminal of the third switching element Qc is connected to the same gate line as the first switching element Qa and the second switching element Qb, and the output terminal thereof is connected to a division reference voltage line such that the portion of the voltage charged to the second liquid crystal capacitor Clca2 and the third liquid crystal capacitor Clcb1 may be divided.

Alternatively, in the liquid crystal display according to another exemplary embodiment of the present invention, the first switching element Qa applying the data voltage to the first subpixel electrode 190a and the fourth subpixel electrode 191b and the second switching element Qb applying the data voltage to the second subpixel electrode 190b and the third subpixel electrode 191a may be connected to different data lines, thereby receiving the data voltages of different magnitudes.

In this way, the liquid crystal display according to an exemplary embodiment of the present invention may be applied to all examples in which the voltage applied to the first subpixel electrode 190a and the fourth subpixel electrode 191b and the voltage applied to the second subpixel electrode 190b and the third subpixel electrode 191a are different from each other.

However, further alternative connection arrangements among thin film transistors and subpixels also lie within the scope of the present invention. For instance, according to one embodiment, the first subpixel electrode 190a is directly connected to a first thin film transistor, and the third subpixel electrode 191a is connected to the first subpixel electrode 190a, for example, via a capacitor, while the second subpixel electrode 190b is directly connected to a second thin film transistor, and the fourth subpixel electrode 191b is directly connected to the second subpixel electrode 190b, for example, via a capacitor. According to another embodiment, the first and second subpixel electrodes 190a, 190b are directly connected to a first thin film transistor, while the third and fourth subpixel electrodes 191a, 191b are directly connected to a second thin film transistor.

In the liquid crystal display according to an exemplary embodiment of the present invention, the ratio of the voltage applied to the first subpixel electrode 190a and the fourth subpixel electrode 191b to the voltage applied to the second subpixel electrode 190b and the third subpixel electrode 191a may be, for example, in a range of about 0.6 to about 0.7. Unlike a conventional liquid crystal display, a display device according to one embodiment has four regions where the ratio is maintained in the range as mentioned above such that the transmittance of the display changes gradually according to the applied voltage without the overall transmittance reduced.

Figure 5:
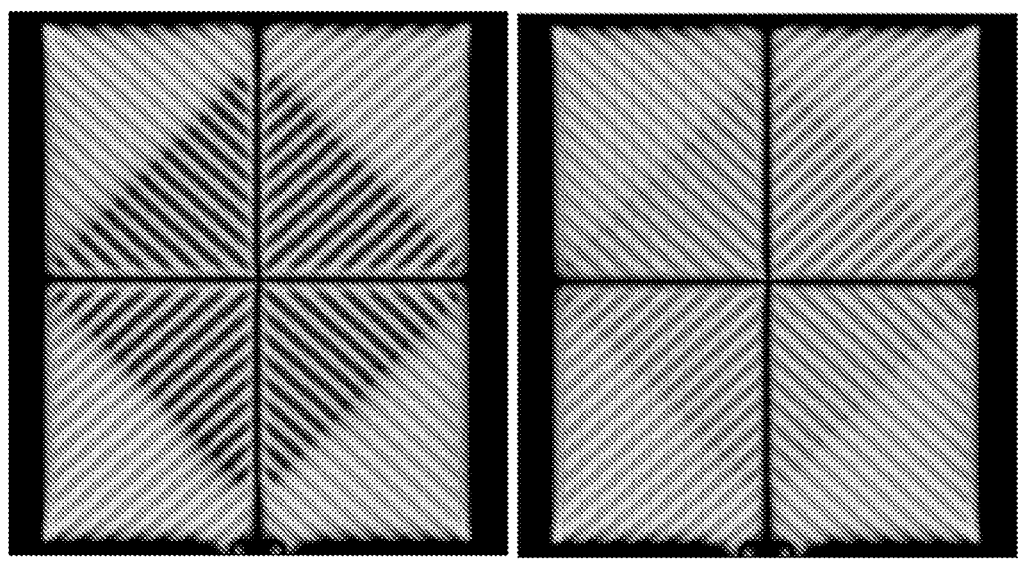
FIG. 5 is a view of a simulation result of a liquid crystal display according an experimental example of the present invention.

Next, a simulation result of a liquid crystal display according to an exemplary embodiment of the present invention is described with reference to FIG. 5 and FIG. 6. FIG. 5 is a view of a simulation result of a liquid crystal display according an experimental example of the present invention, and FIG. 6 is a view of a simulation result of a liquid crystal display according an experimental example of the present invention.

Figure 6:
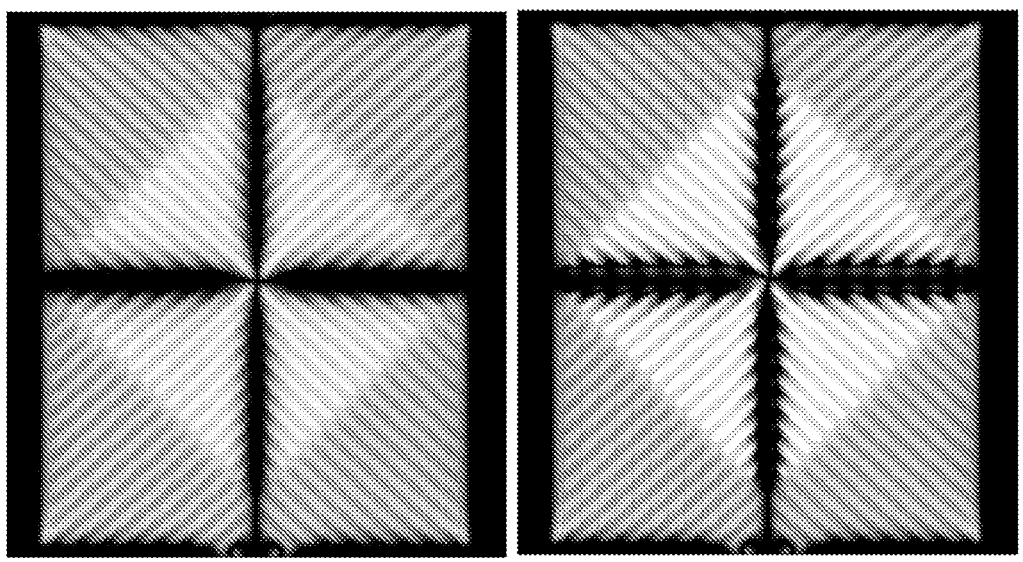
FIG. 6 is a view of a simulation result of a liquid crystal display according an experimental example of the present invention.

For a test cell like the liquid crystal display according to an exemplary embodiment of the present invention, a transmittance result of the first subpixel area PXa is shown in FIG. 5, and a transmittance result of the second subpixel area PXb is shown in FIG. 6. FIG. 5(a) is a case that the ratio of the voltage applied to the first subpixel electrode 190a and the voltage applied to the third subpixel electrode 191a is 0.4:1, and FIG. 5(b) is a case that the ratio of the voltage applied to the first subpixel electrode 190a and the voltage applied to the third subpixel electrode 191a is 0.7:1. FIG. 6(a) is a case that the ratio of the voltage applied to the second subpixel electrode 190b and the voltage applied to the fourth subpixel electrode 191a is 1.3:1, and FIG. 6(b) is a case that the ratio of the voltage applied to the second subpixel electrode 190b and the voltage applied to the fourth subpixel electrode 191b is 1.6:1.

Referring to FIG. 5, the transmittance of the second region where the first subpixel electrode 190a and the third subpixel electrode 191a overlap each other is lower than the transmittance of the first region where the first subpixel electrode 190a and the third subpixel electrode 191a do not overlap.

Referring to FIG. 6, the transmittance of the fourth region where the second subpixel electrode 190b and the fourth subpixel electrode 191b overlap each other is higher than the transmittance of the third region where the second subpixel electrode 190b and the fourth subpixel electrode 191b do not overlap.

Next, a simulation result of the present invention is described with reference to FIG. 7. In the present simulation, while the controlled voltage ratios and the other conditions are all the same, with respect to the second voltage applied to the upper electrode having a plurality of minute branch electrodes and the third voltage applied to the lower electrode of the plate shape, the transmittance measured in the minute slits formed in the region where the lower electrode and the upper electrode overlap each other is shown in FIG. 7.

Measured is the transmittance when the ratio of the second voltage and the third voltage is 1:0.4 (D1), when the ratio of the second voltage and the third voltage is 1:0.7 (D2), when the ratio of the second voltage and the third voltage is 1:1 (D3), when the ratio of the second voltage and the third voltage is 1.3:1 (D4), and when the ratio of the second voltage and the third voltage is 1.7:1 (D5).

Figure 7:
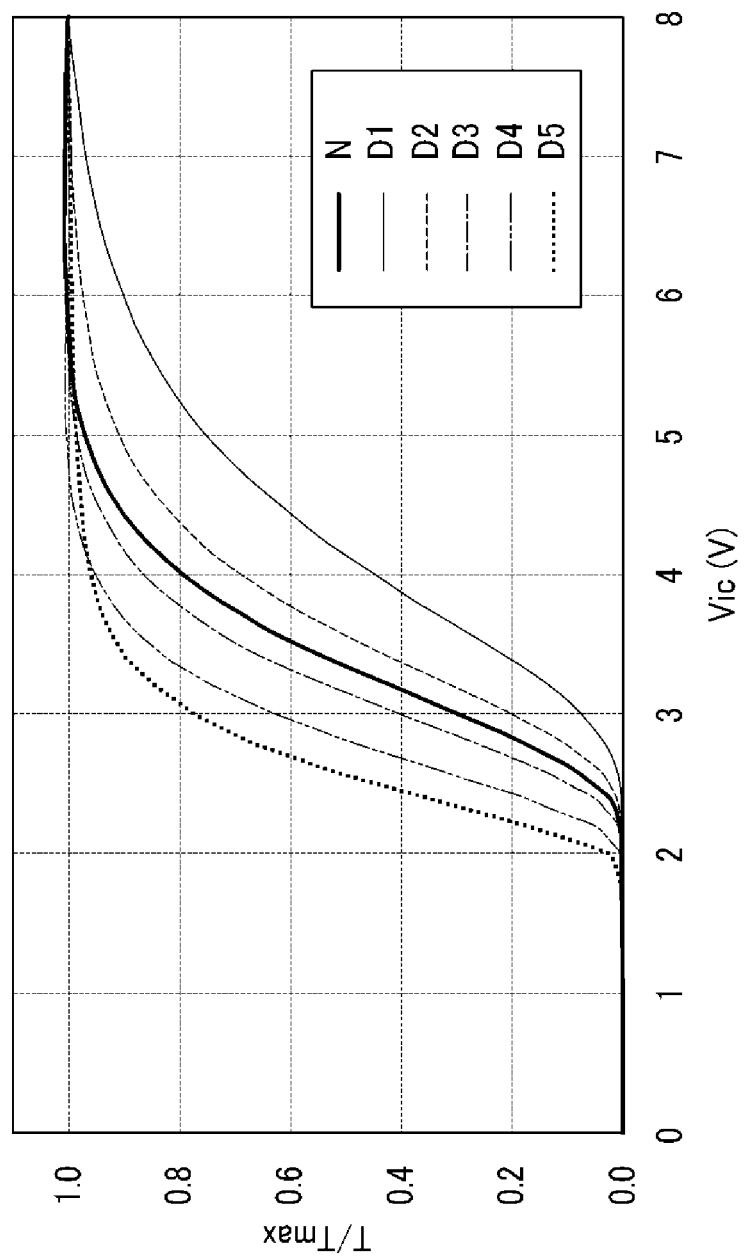
FIG. 7 is a graph showing a simulation result of a liquid crystal display according an experimental example of the present invention.

Referring to FIG. 7, by controlling the ratio of the second voltage applied to the upper electrode having a plurality of minute branch electrodes and the third voltage applied to the lower electrode of the plate shape, the transmittance may be variously changed.

Figure 8:
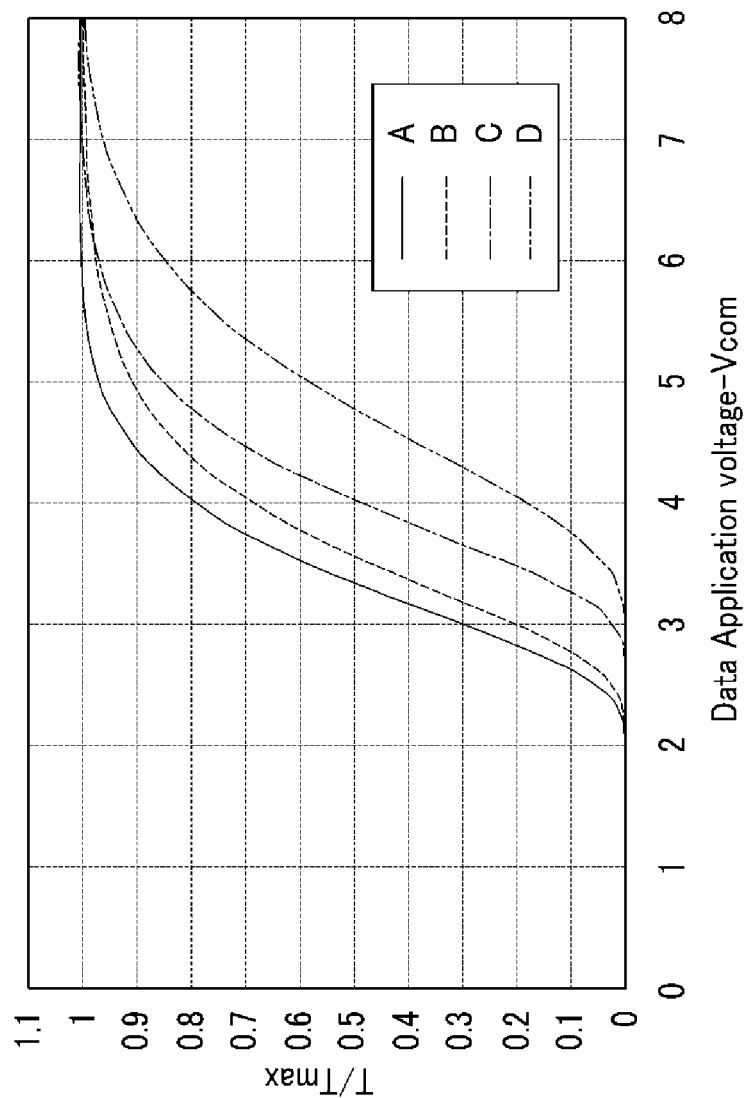
FIG. 8 is a graph showing a simulation result of a liquid crystal display according another experimental example of the present invention.

Next, another simulation result of the present invention will be described with reference to FIG. 8. FIG. 8 is a view of a simulation result of a liquid crystal display according another experimental example of the present invention.

For the applied data voltage in FIG. 8, a region where the change of the transmittance is the largest, that is, the first region, is indicated by A, and a region where the transmittance change is the second largest, that is, the second region, is indicated by B, while the fourth region is indicated by C, and the third region is indicated by D. In this way, the liquid crystal display according to an exemplary embodiment of the present invention includes four regions where the transmittance changes are different according to the applied data voltage. Accordingly, the transmittance change according to a grayscale is not drastic in any part of the grayscale, and the transmittance changes smoothly.

Figure 9:
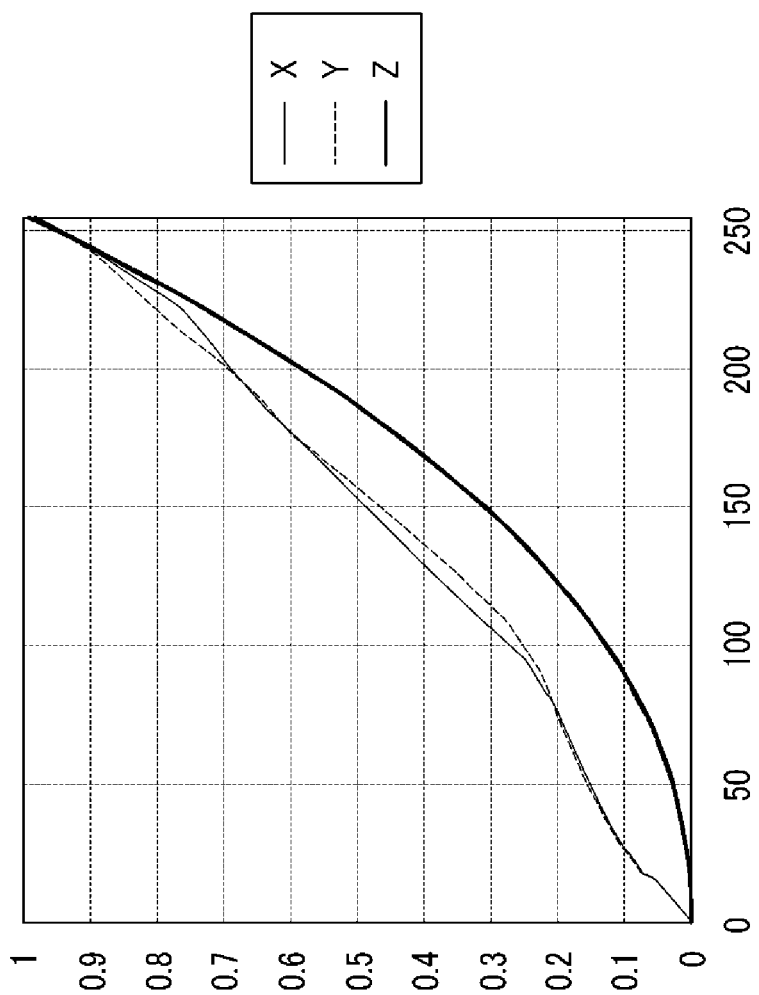
FIG. 9 is a graph showing a simulation result of a liquid crystal display according another experimental example of the present invention.

Next, another simulation result of the present invention is described with reference to FIG. 9. FIG. 9 is a graph showing a simulation result of a liquid crystal display according to another experimental example of the present invention.

Referring to FIG. 9, for the case X where the liquid crystal display is divided into two regions in which the first subpixel electrode applied with the relatively high voltage and the second subpixel electrode applied with the relatively low voltage are positioned like conventional art, the transmittance change according to the grayscale observed from the side is measured. On the other hand, for the case Y where one pixel area is divided into four regions charged with the different voltages like a liquid crystal display according to an exemplary embodiment of the present invention, the transmittance change according to the grayscale observed from the side is measured. In FIG. 9, the transmittance change according to the grayscale observed from the front is indicated by Z.

Referring to FIG. 9, when compared to a conventional liquid crystal display (case X), the liquid crystal display according to an exemplary embodiment of the present invention (case Y) shows the voltage change is smooth without drastic changes with respect to the grayscale.

As described above, in the liquid crystal display according to an exemplary embodiment of the present invention, one pixel area is divided into four regions in which the electric fields applied to the liquid crystal layer are respectively different. Accordingly, by smoothly controlling the transmittance change according to the grayscale, any quick change of the transmittance according to the grayscale not observed from the side, especially in the low grayscale portion and the high grayscale portion, thereby improving the side visibility closer to the front visibility, and the grayscale expression can be enhanced, especially in the low grayscale portion and the high grayscale portion.

Next, another simulation result of the present invention is described with reference FIG. 10 and FIG. 11. In the present experimental example, one pixel area includes a first subpixel electrode and a second subpixel electrode formed in the shape of a plate, and a third subpixel electrode and a fourth subpixel electrode including portions overlapping the first subpixel electrode and the second subpixel electrode, respectively, and having a plurality of branch electrodes. Further, a first voltage is applied to the first subpixel electrode and the third subpixel electrode overlapping each other, and a second voltage is applied to the second subpixel electrode and the fourth subpixel electrode overlapping each other, while the first voltage applied to the first subpixel electrode and the third subpixel electrode is larger than the second voltage applied to the second subpixel electrode and the fourth subpixel electrode. The transmittance change according to the applied voltage is shown in FIG. 10.

In the present experimental example, like the liquid crystal display according to an exemplary embodiment of the present invention, one pixel area includes a first subpixel electrode and a second subpixel electrode formed in the shape of a plate, and a third subpixel electrode and a fourth subpixel electrode including portions overlapping the first subpixel electrode and the second subpixel electrode, respectively, and having a plurality of branch electrodes. Further, the first voltage of the same magnitude is applied to the first subpixel electrode and the fourth subpixel electrode, and the data voltage of the same magnitude is applied to the second subpixel electrode and the third subpixel electrode. The transmittance change according to the applied voltage is shown in FIG. 11.

Figure 10:
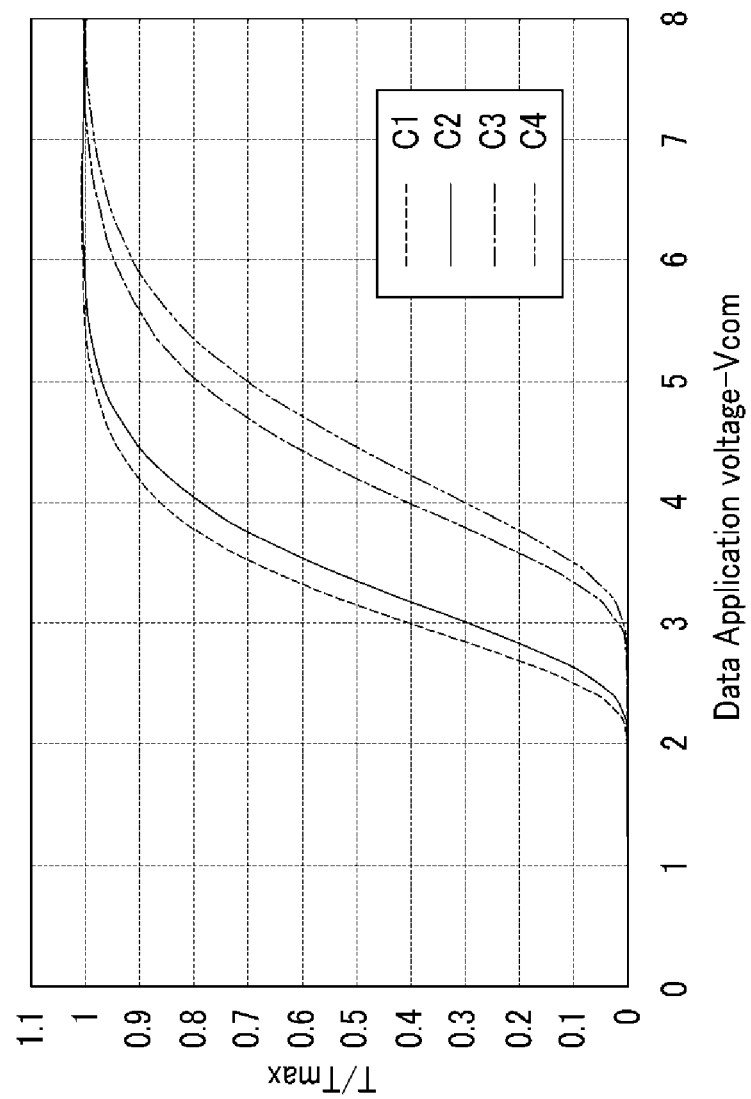
FIG. 10 is a graph showing a liquid crystal display according to another exemplary embodiment of the present invention.
Figure 11:
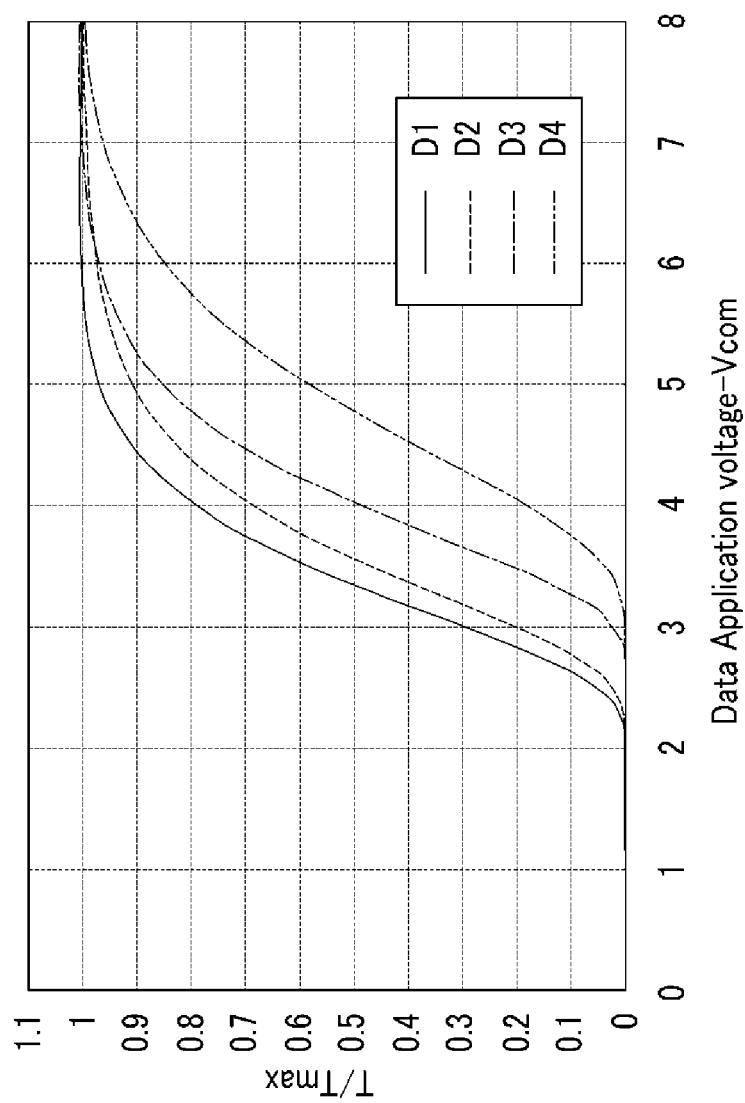
FIG. 11 is a graph showing a simulation result of a liquid crystal display according another experimental example of the present invention.

Referring to FIG. 10 and FIG. 11, when the first subpixel electrode and the third subpixel electrode overlapping each other are applied with the same voltage, and the second subpixel electrode and the fourth subpixel electrode overlapping each other are applied with the same voltage, the transmittance change according to the voltage has a large difference between C1 and C2, and C3 and C4. However, like the liquid crystal display according to an exemplary embodiment of the present invention, when applying the different voltages to the subpixel electrodes overlapping each other, the transmittance change according to the voltage is uniform in D1 to D4. That is, the transmittance change according to the grayscale is smooth with no or little quick change.

Next, a liquid crystal display according to another exemplary embodiment of the present invention is described with reference to FIG. 12.

Figure 12:
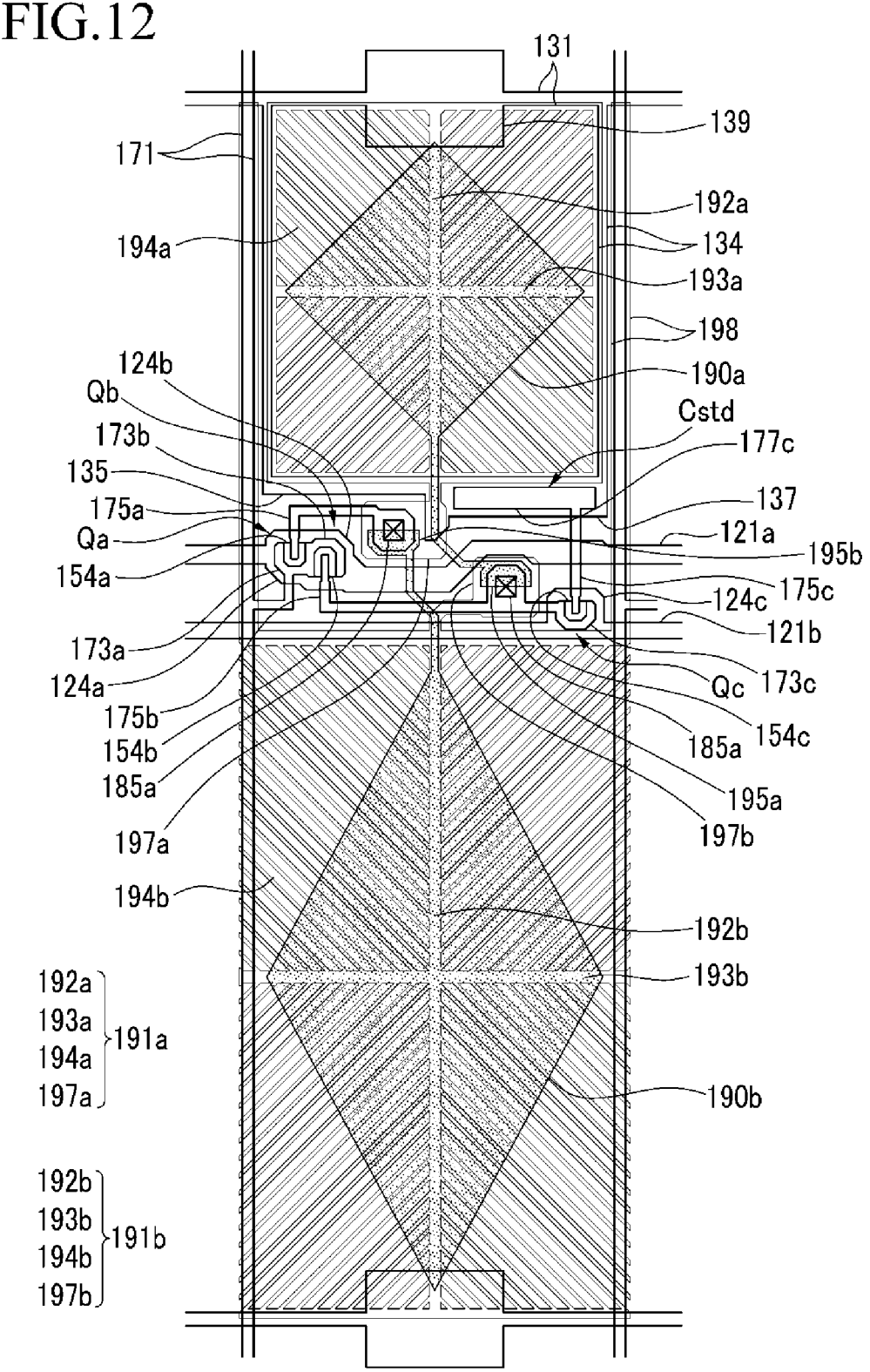
FIG. 12 is a view of a simulation result of a liquid crystal display according another experimental example of the present invention.

Referring to FIG. 12, the liquid crystal display according to the present exemplary embodiment is similar to the liquid crystal display according to the exemplary embodiment described with reference to FIG. 1 to FIG. 3. The detailed description for the same constituent elements is not repeated.

In the liquid crystal display according to the present exemplary embodiment, unlike the exemplary embodiment shown in FIG. 1 to FIG. 3, the width of a plurality of minute slits defining a plurality of minute branch electrodes 194a and 194b of the third subpixel electrode 191a and the fourth subpixel electrode 191b is wider than the width of the plurality of minute branch electrodes.

In this way, as the width of the minute slits is wider, the influence of the first subpixel electrode 190a and the second subpixel electrode 190b positioned under a plurality of minute branch electrodes 194a and 194b of the third subpixel electrode 191a and the fourth subpixel electrode 191b is increased. Also, the entire transmittance of the liquid crystal display may be changed.

One of ordinary skill in the art will appreciate, however, that according to another exemplary embodiment of the present invention, the width of a plurality of minute slits defining a plurality of minute branch electrode 194a and 194b of the third subpixel electrode 191a and the fourth subpixel electrode 191b may be formed to be narrower than the width of the plurality of minute branch electrodes.

All characteristics according to the exemplary embodiments previously described with reference to FIG. 1 to FIG. 11 may be applied to the liquid crystal display according to the present exemplary embodiment.

Next, another simulation result of the present invention is described with reference to FIG. 13. FIG. 13 is a view of a simulation result of a liquid crystal display according another experimental example of the present invention.

In the present experimental example, with the other conditions all the same, the transmittance of the test pixel is measured as the width of a plurality of branch electrodes and the width of a plurality of minute slits change.

FIG. 13(a) is a case that the width of a plurality of minute branch electrodes 194a and 194b of the third subpixel electrode 191a and the fourth subpixel electrode 191b is the same as the width of a plurality of minute slits as in the exemplary embodiment shown in FIG. 1. FIG. 13(b) is a case that the width of a plurality of minute branch electrodes 194a and 194b of the third subpixel electrode 191a and the fourth subpixel electrode 191b is narrower than the width of a plurality of minute slits as in the exemplary embodiment shown in FIG. 12.

Referring to FIG. 13, by changing the width of a plurality of minute branch electrodes 194a and 194b of the third subpixel electrode 191a and the fourth subpixel electrode 191b and the width of a plurality of minute slits, the different transmittance may be obtained.

Figure 14:
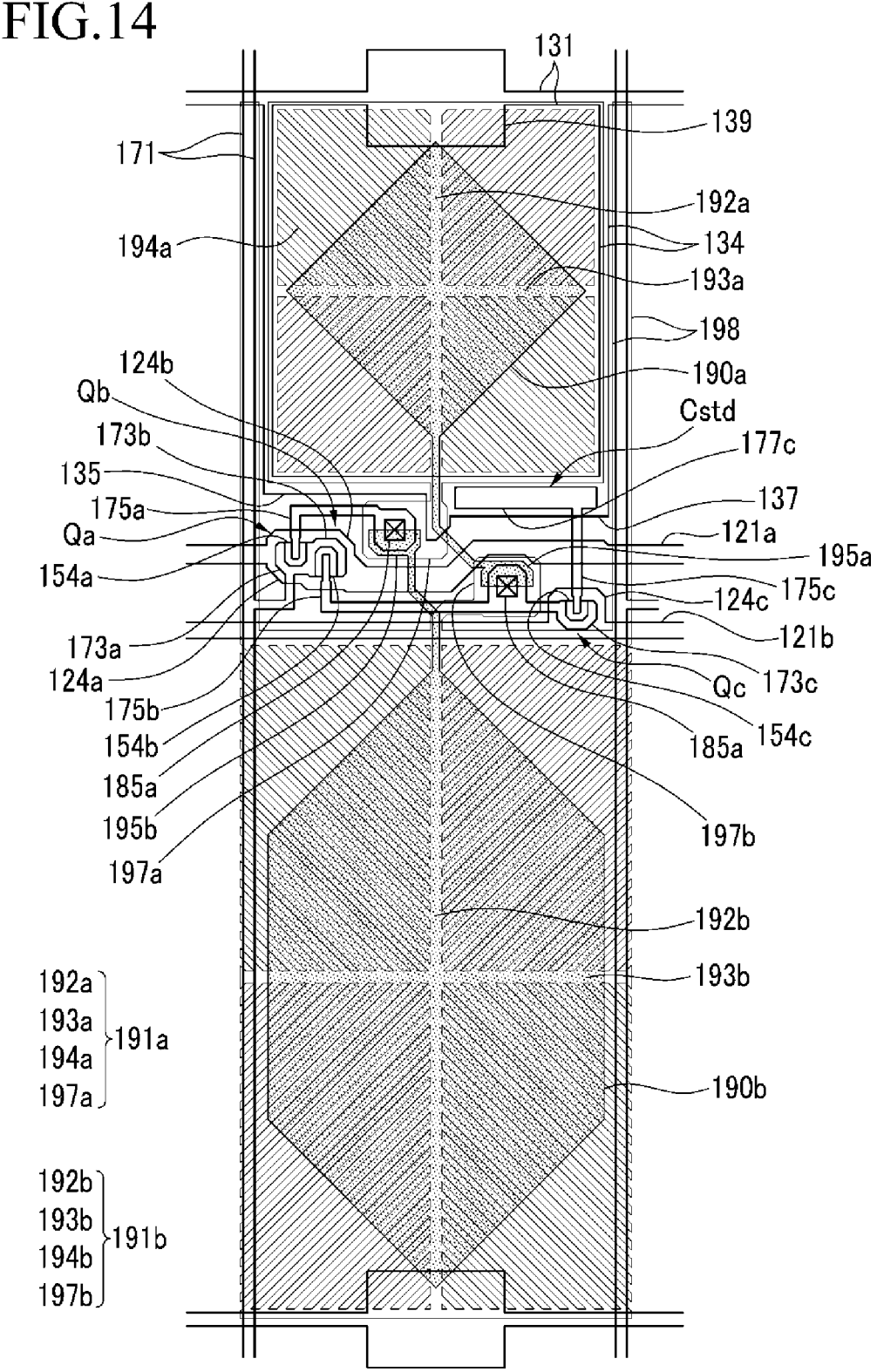
FIG. 14 is a layout view of a liquid crystal display according to another exemplary embodiment of the present invention.

Next, a liquid crystal display according to another exemplary embodiment of the present invention is described with reference to FIG. 14. FIG. 14 is a layout view of a liquid crystal display according to another exemplary embodiment of the present invention.

Referring to FIG. 14, the liquid crystal display according to the present exemplary embodiment is similar to the liquid crystal display according to the exemplary embodiment described with reference to FIG. 1 to FIG. 3. The detailed description of the same constituent elements is not repeated.

However, in the liquid crystal display according to the present exemplary embodiment, unlike the exemplary embodiment shown in FIG. 1 to FIG. 3, the first subpixel electrode 190a and the second subpixel electrode 190b have a plane hexagonal shape. As seen in this embodiment, the first subpixel electrode 190a and the second subpixel electrode 190b may have various shapes to overlap portions of the third subpixel electrode 191a and the fourth subpixel electrode 191b. That is, one skilled in the art will appreciate that the shape of the first subpixel electrode 190a and the second subpixel electrode 190b is not limited to those shown in the drawings, but may be formed in any suitable shape to overlap portions of the third subpixel electrode 191a and the fourth subpixel electrode 191b.

All characteristics according to the exemplary embodiments previously described with reference to FIG. 1 to FIG. 11 may be applied to the liquid crystal display according to the present exemplary embodiment.

Figure 15:
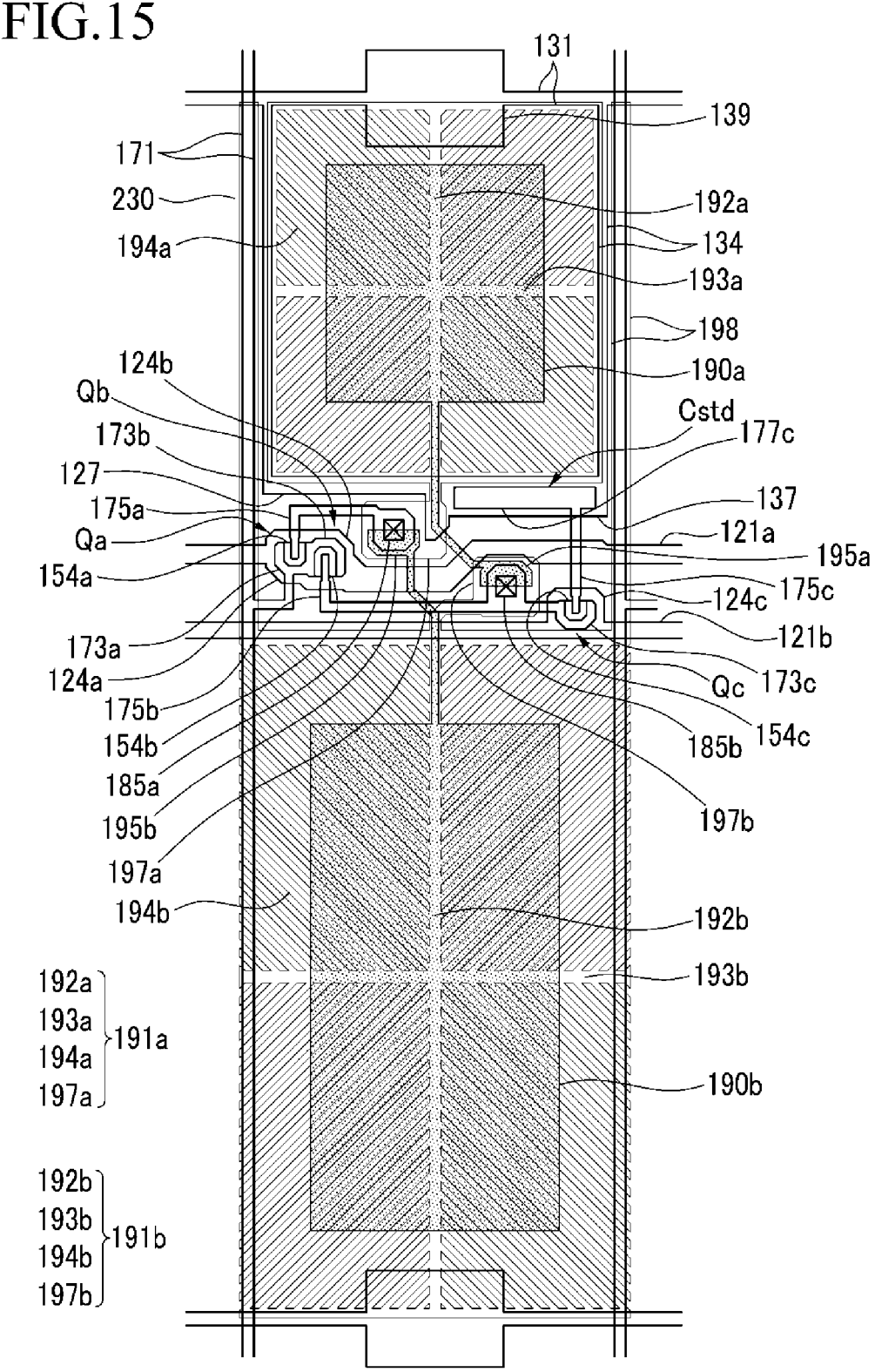
FIG. 15 is a layout view of a liquid crystal display according to another exemplary embodiment of the present invention.

Next, a liquid crystal display according to another exemplary embodiment of the present invention will be described with reference to FIG. 15. FIG. 15 is a layout view of a liquid crystal display according to another exemplary embodiment of the present invention.

Referring to FIG. 15, the liquid crystal display according to the present exemplary embodiment is similar to the liquid crystal display according to the exemplary embodiment described with reference to FIG. 1 to FIG. 3. The detailed description of the same constituent elements is not repeated.

However, in the liquid crystal display according to the present exemplary embodiment, unlike the exemplary embodiment shown in FIG. 1 to FIG. 3, the first subpixel electrode 190a and the second subpixel electrode 190b have a plane rectangular shape. As shown in this embodiment, the first subpixel electrode 190a and the second subpixel electrode 190b may have various shapes to overlap portions of the third subpixel electrode 191a and the fourth subpixel electrode 191b.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a first substrate comprising a pixel area comprising a first subpixel area and a second subpixel area;
    a first subpixel electrode disposed in the first subpixel area and a second subpixel electrode disposed in the second subpixel area on the first substrate;
    an insulating layer disposed on the first subpixel electrode and the second subpixel electrode;
    a third subpixel electrode disposed on the insulating layer in the first subpixel area and overlapping the first subpixel electrode;
    a fourth subpixel electrode disposed on the insulating layer in the second subpixel area and overlapping the second subpixel electrode;
    a first thin film transistor connected to the first subpixel electrode and the fourth subpixel electrode;
    a second thin film transistor connected to the second subpixel electrode and the third subpixel electrode;
    a second substrate facing the first substrate;
    a step-down unit connected to the second thin film transistor and comprising a step-down capacitor and a third thin film transistor; and
    a liquid crystal layer interposed between the first substrate and the second substrate and comprising a plurality of liquid crystal molecules, wherein:
    the first subpixel electrode and the second subpixel electrode have a plate shape;
    the third subpixel electrode and the fourth subpixel electrode comprise:
        a cross-shaped stem comprising a horizontal stem and a longitudinal stem crossing the horizontal stem; and
        minute branch electrodes extending from the cross-shaped stem,
    a portion of the first subpixel electrode are exposed between adjacent minute branch electrodes of the third subpixel electrode and a portion of the second subpixel electrode are exposed between adjacent minute branch electrodes of the fourth subpixel electrode; and
    the first and the second subpixel electrodes are disposed in the same layer.

2. The liquid crystal display of claim 1, wherein
    the first subpixel area comprises a first portion where the first subpixel electrode and the third subpixel electrode overlap and a second portion where the first subpixel electrode and the third subpixel electrode do not overlap, and
    the second subpixel area includes a third portion where the second subpixel electrode and the fourth subpixel electrode are overlap and a fourth portion where the second subpixel electrode and the fourth subpixel electrode do not overlap.

3. The liquid crystal display of claim 2, wherein the third subpixel electrode and the fourth subpixel electrode comprise a plurality of branch electrodes and a plurality of minute slits positioned therebetween, and the width of the plurality of branch electrodes and the width of the plurality of minute slits are the same as or different from each other.

4. The liquid crystal display of claim 2, wherein the first subpixel electrode has a rhombus plane shape, a hexagonal plane shape, or a quadrangle plane shape, and the second subpixel electrode has a rhombus plane shape, a hexagonal plane shape, or a quadrangle plane shape.

5. The liquid crystal display of claim 2, wherein the first subpixel electrode and the fourth subpixel electrode are configured to receive a voltage different from a voltage applied to the second subpixel electrode and the third subpixel electrode.

6. The liquid crystal display of claim 5, further comprising an alignment layer disposed on at least one of the first substrate and the second substrate, wherein at least one of the liquid crystal layer and the alignment layer comprises a photoreactive material.

7. The liquid crystal display of claim 1, wherein the third subpixel electrode and the fourth subpixel electrode comprise a plurality of branch electrodes and a plurality of minute slits positioned therebetween, and the width of the plurality of branch electrodes and the width of the plurality of minute slits are the same as or different from each other.

8. The liquid crystal display of claim 1, wherein the first subpixel electrode has a rhombus plane shape, a hexagonal plane shape, or a quadrangle plane shape, and the second subpixel electrode has a rhombus plane shape, a hexagonal plane shape, or a quadrangle plane shape.

9. The liquid crystal display of claim 1, wherein the first subpixel electrode and the fourth subpixel electrode are configured to receive a voltage different from a voltage applied to the second subpixel electrode and the third subpixel electrode.

10. The liquid crystal display of claim 9, further comprising an alignment layer disposed on at least one of the first substrate and the second substrate, wherein at least one of the liquid crystal layer and the alignment layer comprises a photoreactive material.

11. The liquid crystal display of claim 1, wherein the first subpixel electrode and the fourth subpixel electrode are configured to receive a voltage different from a voltage applied to the second subpixel electrode and the third subpixel electrode.

12. The liquid crystal display of claim 11, further comprising an alignment layer disposed on at least one of the first substrate and the second substrate, wherein at least one of the liquid crystal layer and the alignment layer comprises a photoreactive material.

13. The liquid crystal display of claim 1, further comprising an alignment layer disposed on at least one of the first substrate and the second substrate, wherein at least one of the liquid crystal layer and the alignment layer includes a photoreactive.

14. A liquid crystal display comprising:

a first substrate;

a second substrate facing the first substrate;

a liquid crystal layer interposed between the first substrate and the second substrate and comprising liquid crystal molecules;

a first gate line and a first data line disposed on the first substrate;

a first thin film transistor and a second thin film transistor both connected to the first gate line and the first data line;

a first pixel electrode connected to the first thin film transistor and a second pixel electrode connected to the second thin film transistor, the first pixel electrode partially overlapping the second pixel electrode relative to a direction perpendicular to the first substrate and the second substrate;

a third pixel electrode connected to the first thin film transistor and a fourth pixel electrode connected to the second thin film transistor, the third pixel electrode partially overlapping the fourth pixel electrode relative to a direction perpendicular to the first substrate and the second substrate, and a step-down unit connected to the second thin film transistor and comprising a step-down capacitor and a third thin film transistor, wherein the first subpixel electrode and the second subpixel electrode have a plate shape;

the third subpixel electrode and the fourth subpixel electrode comprise:

a cross-shaped stem comprising a horizontal stem and a longitudinal stem crossing the horizontal stem; and minute branch electrodes extending from the cross-shaped stem, a portion of the first subpixel electrode are exposed between adjacent minute branch electrodes of the third subpixel electrode and a portion of the second subpixel electrode are exposed between adjacent minute branch electrodes of the fourth subpixel electrode; and the first and the second subpixel electrodes are disposed in the same layer.

15. The liquid crystal display of claim 14, further comprising:

a first insulation layer disposed between the first pixel electrode and the second pixel electrode; and a second insulation layer disposed between the third pixel electrode and the fourth pixel electrode.

16. The liquid crystal display of claim 1, wherein an output terminal of the third thin film transistor is connected to the step-down capacitor.

17. The liquid crystal display of claim 1, further comprising:

a first gate line connected to control terminals of the first thin film transistor and the second thin film transistor; and a second gate line connected to a control terminal of the third thin film transistor.

18. The liquid crystal display of claim 1, further comprising:

a gate line connected to control terminals of the first thin film transistor, the second thin film transistor, and the third thin film transistor.

* * * * *